(12) United States Patent
Novin

(10) Patent No.: US 10,336,230 B2
(45) Date of Patent: Jul. 2, 2019

(54) FRICTION MODULE, FRICTION HINGE, AND ADJUSTABLE HEADREST INCLUDING THE FRICTION MODULE AND/OR FRICTION HINGE

(71) Applicant: Southco, Inc., Concordville, PA (US)

(72) Inventor: Eugene Novin, Concordville, PA (US)

(73) Assignee: SOUTHCO, INC., Concordville, PA (US)

( * ) Notice: Subject to any disclaimer, the term of this patent is extended or adjusted under 35 U.S.C. 154(b) by 0 days.

(21) Appl. No.: 15/558,645

(22) PCT Filed: Mar. 16, 2016

(86) PCT No.: PCT/US2016/022606
§ 371 (c)(1),
(2) Date: Sep. 15, 2017

(87) PCT Pub. No.: WO2016/149341
PCT Pub. Date: Sep. 22, 2016

(65) Prior Publication Data
US 2018/0105087 A1 Apr. 19, 2018

Related U.S. Application Data

(60) Provisional application No. 62/133,778, filed on Mar. 16, 2015.

(51) Int. Cl.
*B60N 2/80* (2018.01)
*B60N 2/809* (2018.01)
(Continued)

(52) U.S. Cl.
CPC ............. *B60N 2/809* (2018.02); *B60N 2/812* (2018.02); *B60N 2/826* (2018.02); *B60N 2/885* (2018.02);
(Continued)

(58) Field of Classification Search
CPC .......... B60N 2/809; B60N 2/826; B60N 2/85; B60N 2/812; B60N 2/824; B60N 2/885;
(Continued)

(56) References Cited

U.S. PATENT DOCUMENTS

| 4,527,834 | A | 7/1985 | Zyngier |
| 4,840,428 | A | 6/1989 | Kobayashi et al. |
| 7,434,886 | B2 * | 10/2008 | Yamada ................. B60N 2/818 297/410 |
| 9,004,803 | B2 * | 4/2015 | Wanke .................. B60N 2/809 403/325 |

(Continued)

FOREIGN PATENT DOCUMENTS

FR  2099760 A5  3/1972

OTHER PUBLICATIONS

International Preliminary Report on Patentability for International Application No. PCT/US2016/022606, dated Sep. 19, 2017—9 Pages.

(Continued)

*Primary Examiner* — Mark R Wendell
(74) *Attorney, Agent, or Firm* — RatnerPrestia

(57) ABSTRACT

An adjustable headrest 300 includes a guide 360 configured to be coupled to a seat, a head support 302 coupled to the guide and configured to be movable along an adjustment path relative to the seat, and a slider 370 having a surface defining a recess 373 receiving the guide such that the surface of the slider contacts a surface of the guide. The adjustment headrest further includes a retainer 390 positioned to urge the surface of the slider against the surface of the guide, thereby maintaining friction between the surface of the slider and the surface of the guide and resisting unintended movement of the slider with respect to the guide along the adjustment path. Also, a friction module and a friction hinge are provided, which can be incorporated into an adjustable headrest or other assemblies in which sliding and/or hinged components are desired.

20 Claims, 15 Drawing Sheets

(51) Int. Cl.
*B64D 11/06* (2006.01)
*B60N 2/826* (2018.01)
*B60N 2/885* (2018.01)
*B60N 2/812* (2018.01)
*F16C 11/10* (2006.01)
*F16D 63/00* (2006.01)
*F16M 13/02* (2006.01)

(52) U.S. Cl.
CPC ........ *B64D 11/0642* (2014.12); *F16C 11/103* (2013.01); *F16D 63/008* (2013.01); *F16M 13/022* (2013.01); *F16M 2200/027* (2013.01)

(58) Field of Classification Search
CPC .. B64D 11/0642; F16C 11/103; F16D 63/008; F16M 13/022; F16M 2200/027
USPC ........................................................ 297/410
See application file for complete search history.

(56) References Cited

U.S. PATENT DOCUMENTS

| | | | |
|---|---|---|---|
| 9,592,755 B2* | 3/2017 | Takayama | B60R 21/055 |
| 9,902,301 B2* | 2/2018 | Aquillue | B60N 2/809 |
| 10,099,589 B2* | 10/2018 | Takeuchi | B60N 2/80 |
| 2004/0007910 A1 | 1/2004 | Skelly | |
| 2012/0124777 A1 | 5/2012 | Keller | |
| 2012/0200135 A1 | 8/2012 | Muto et al. | |
| 2013/0069412 A1 | 3/2013 | Tscherbner et al. | |

OTHER PUBLICATIONS

International Search Report and Written Opinion for International Application No. PCT/US2016/022606, dated Jun. 21, 2016—12 Pages.
Non Final Office Action for U.S. Appl. No. 16/005,397, dated Jan. 7, 2019, 17 pages.

* cited by examiner

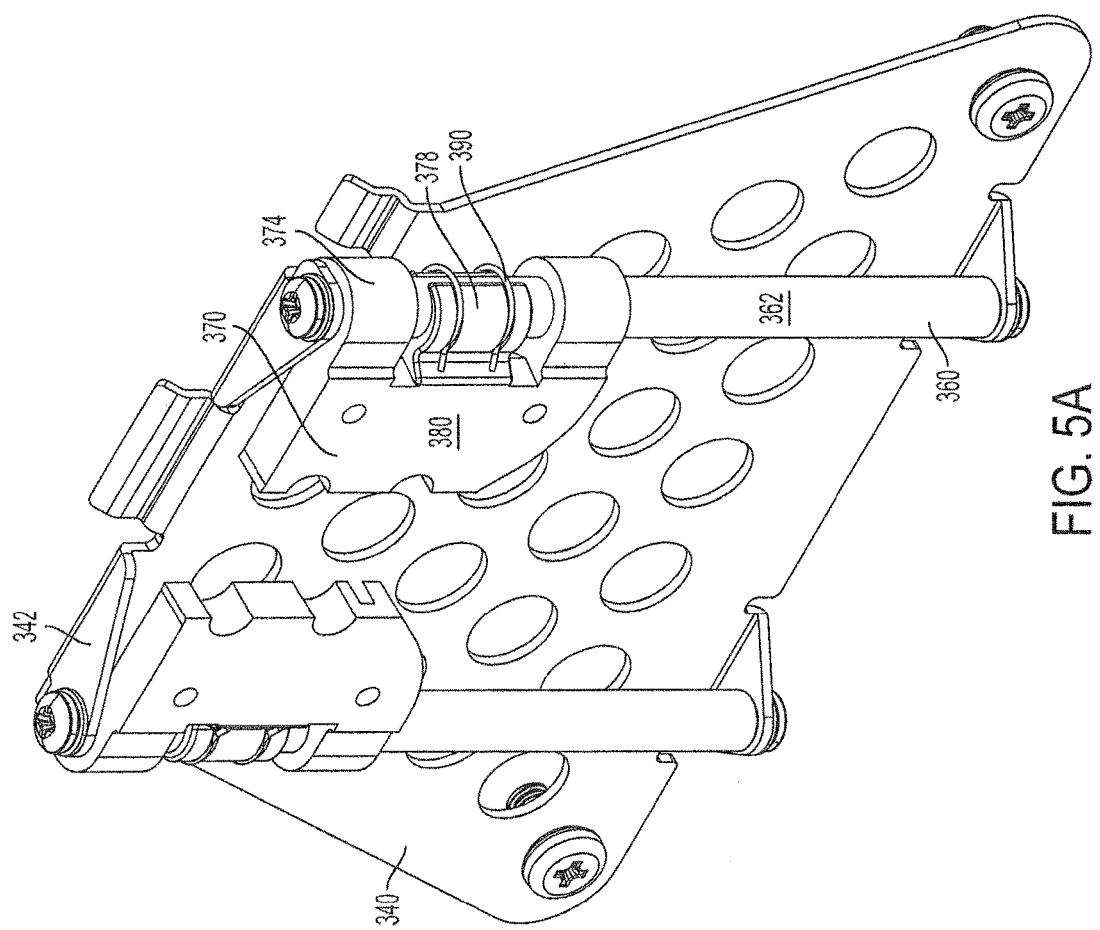

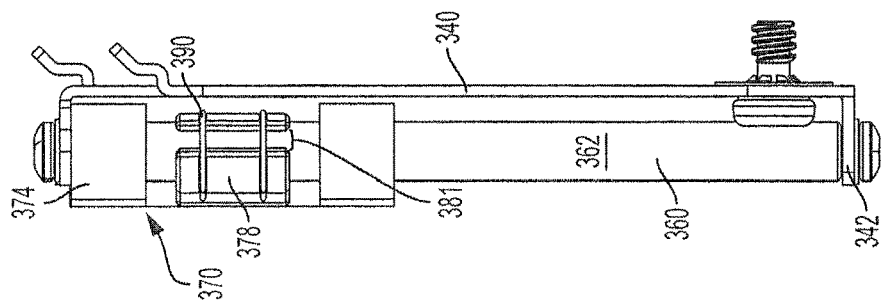
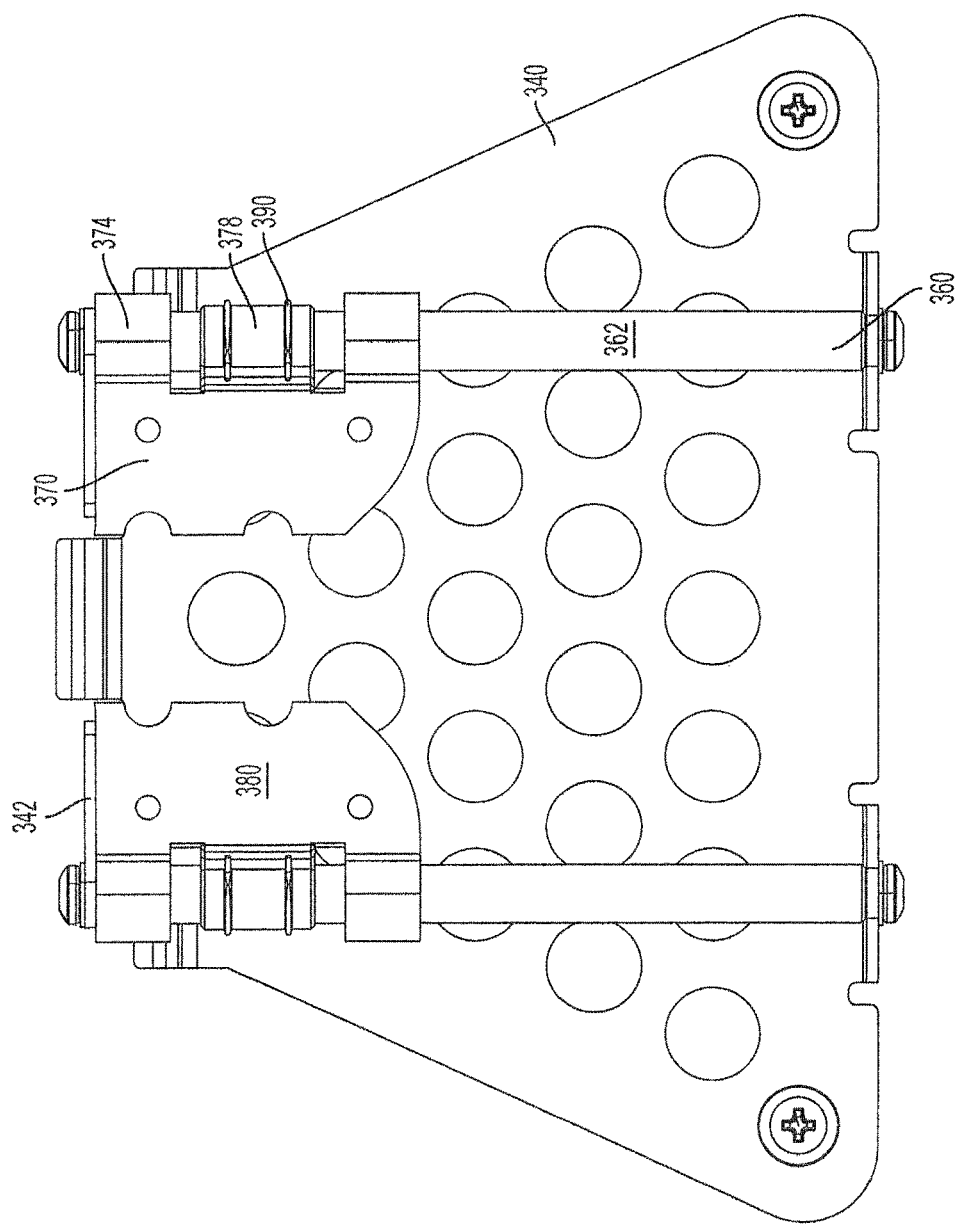
FIG. 5C
FIG. 5B

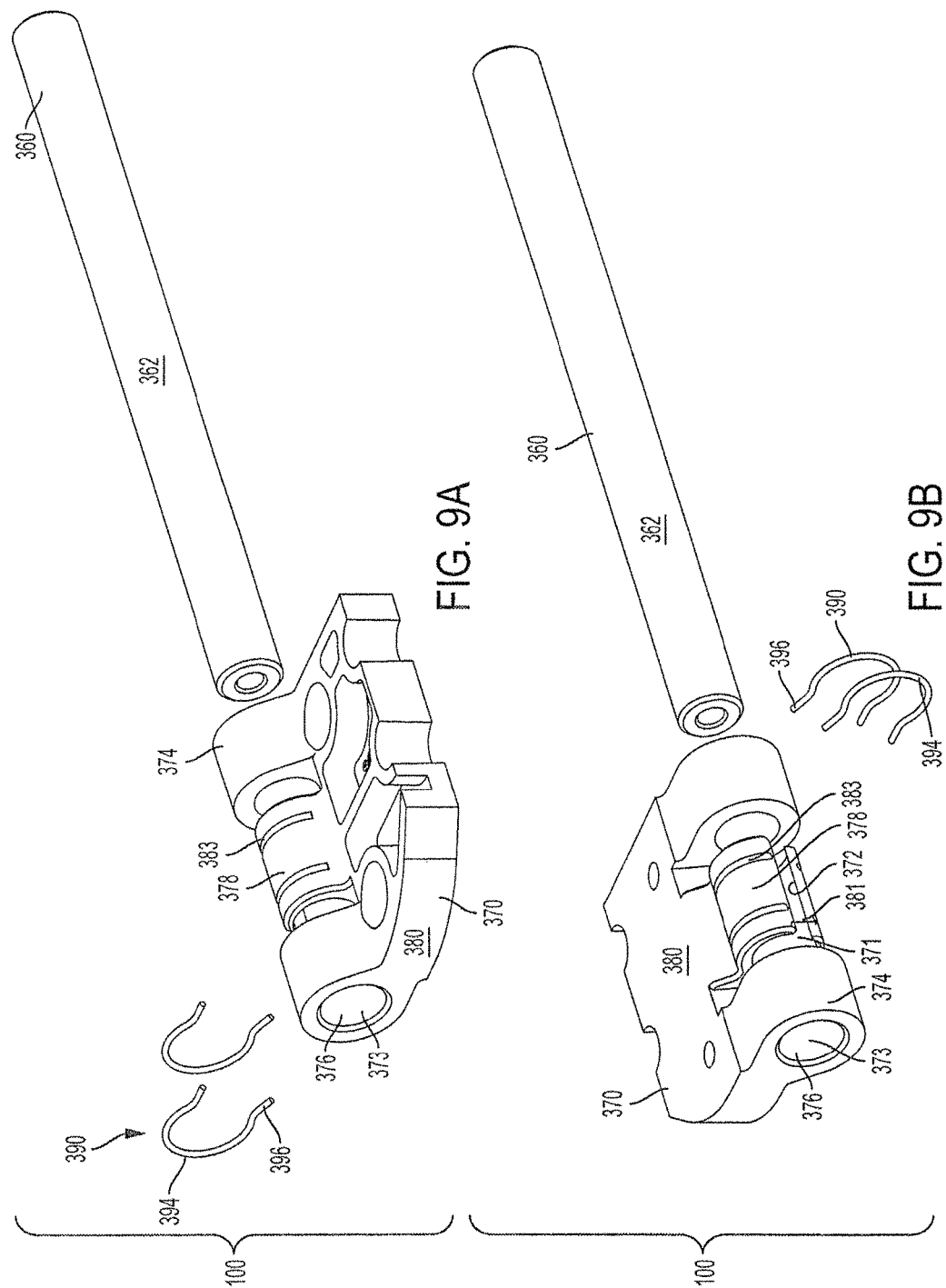

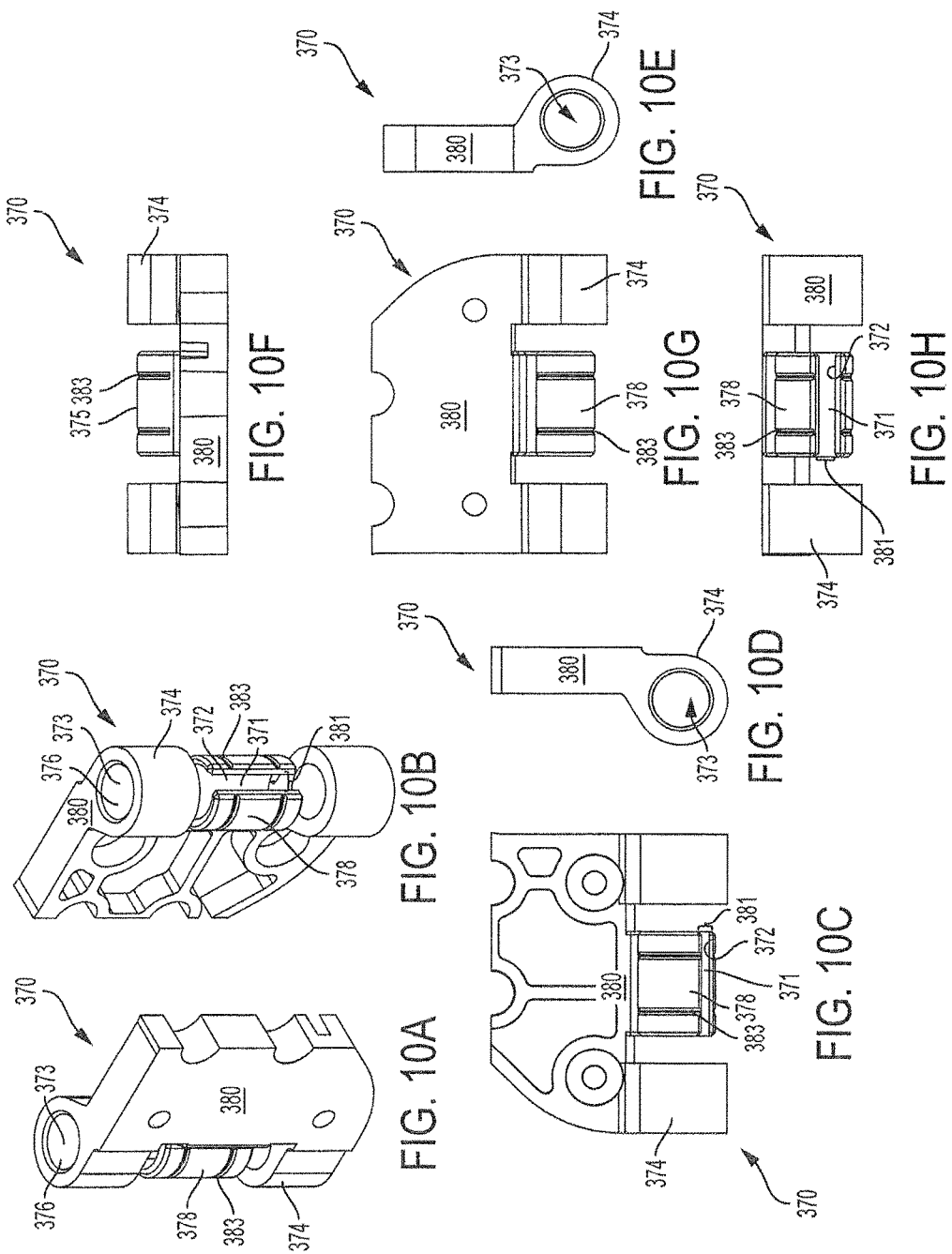

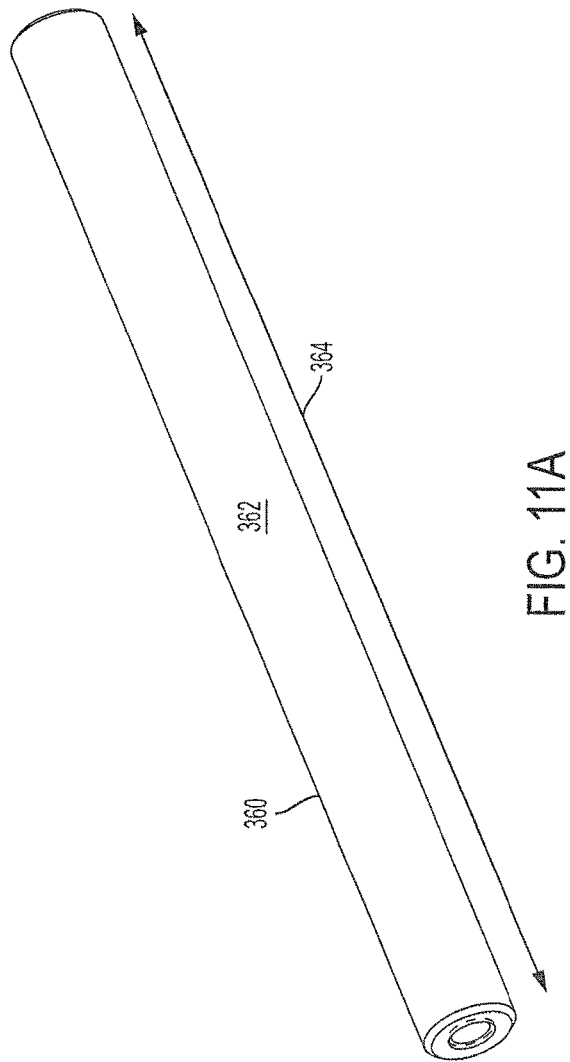
FIG. 11A
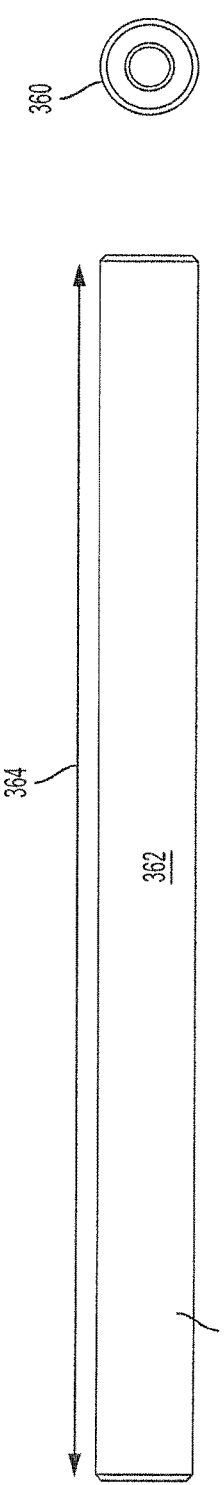
FIG. 11B
FIG. 11C

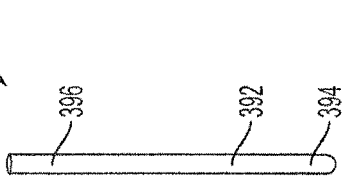
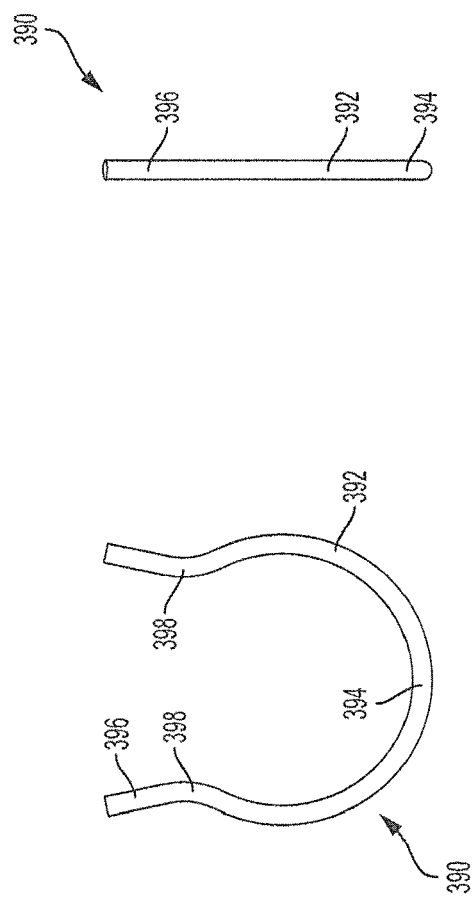
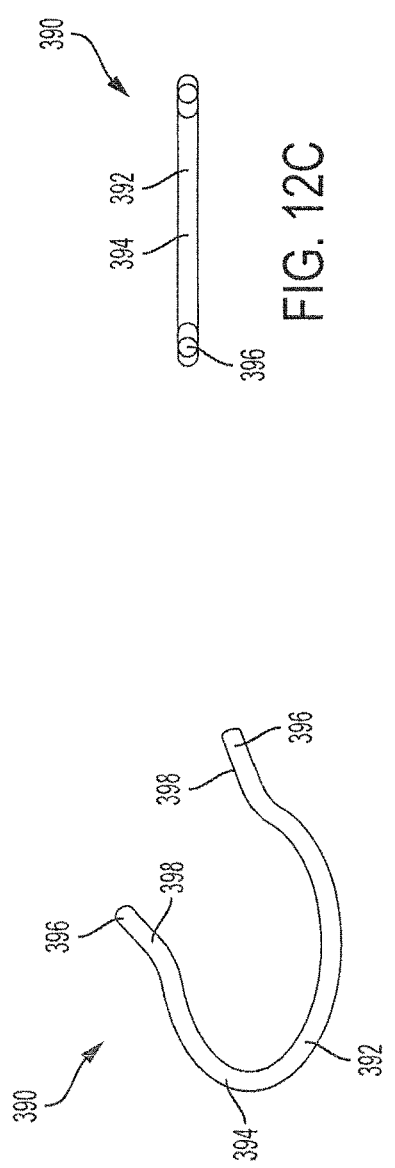
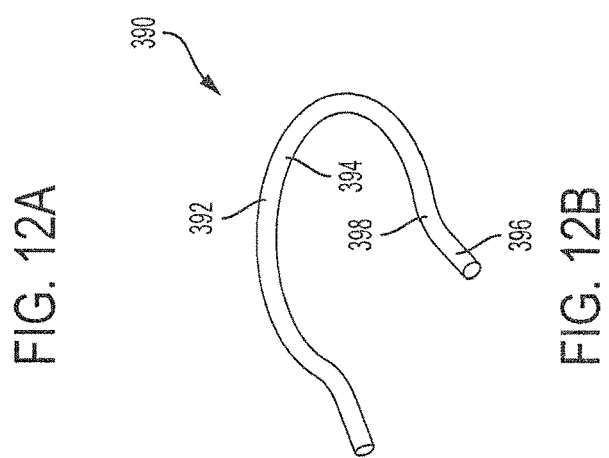

FRICTION MODULE, FRICTION HINGE, AND ADJUSTABLE HEADREST INCLUDING THE FRICTION MODULE AND/OR FRICTION HINGE

CROSS-REFERENCE TO RELATED APPLICATION

This application is the U.S. National Phase Application of PCT Application No. PCT/US2016/022606, filed Mar. 16, 2016 which is related to, and claims the benefit of priority of, U.S. Provisional Application No. 62/133,778, entitled FRICTION MODULE, FRICTION HINGE, AND ADJUSTABLE HEADREST INCLUDING THE FRICTION MODULE AND/OR FRICTION HINGE, filed on Mar. 16, 2015, the contents of which are incorporated herein by reference in their entirety for all purposes.

BACKGROUND OF THE INVENTION

Passenger seats of vehicles typically include a headrest located at the top of the seat. The purpose of a headrests is increase the safety and comfort of the passenger by providing support to the back of the passenger's head. To accommodate for the differing heights among passengers, headrests are often designed to be adjustable in a vertical direction. Once the headrest is adjusted in the vertical direction, it is desirable to maintain the headrest at the desired height.

Airplane seat headrests face additional design requirements. For example, as commercial airline companies continue to seek new ways to decrease fuel costs, it is advantageous to produce a lightweight headrest that provides sufficient safety and comfort to the passenger. Additionally, headrests that have uncomplicated adjustment mechanisms provide the additional advantage of reducing maintenance time, and thus, increasing the amount of time the airplane is in service.

SUMMARY OF THE INVENTION

Aspects of the present invention include an adjustable headrest apparatus and systems thereof. The adjustable headrest includes a guide configured to be coupled to a seat, a head support coupled to the guide and configured to be movable along an adjustment path relative to the seat, and a slider having a surface defining a recess receiving the guide such that the surface of the slider contacts a surface of the guide. The adjustment headrest further includes one or more retainers positioned to urge the surface of the slider against the surface of the guide, thereby maintaining friction between the surface of the slider and the surface of the guide and resisting unintended movement of the slider with respect to the guide along the adjustment path.

Further aspects of the present invention include a friction module apparatus and systems including a friction module. Friction modules may be employed for generating friction between components and resisting unintended movement of the components with respect to one another along a path. The friction module includes a guide configured to be coupled to one of the components, the guide having a longitudinal axis extending along the path; a slider configured to be coupled to another one of the components, the slider having a surface defining a recess receiving the guide such that the surface of the slider contacts a surface of the guide, wherein the slider defines a gap extending from the recess to an outer surface of the slider, thereby permitting compression of the slider to increase the friction between the surface of the slider and the surface of the guide. The friction modules may further have one or more retainers positioned to urge the surface of the slider against the surface of the guide, thereby maintaining friction between the surface of the slider and the surface of the guide as the slider is moved relative to the guide along the path, wherein friction is generated between the components sufficient to resist unintended movement of the components with respect to one another along a path.

Additional aspects of the present invention include a friction hinge apparatus and systems including a friction hinge. Friction hinges may provide a pivot axis for components coupled to one another. Friction hinges include a shaft having a longitudinal axis extending along the pivot axis, a hinged component having a surface defining a recess receiving the shaft such that the surface of the hinged component contacts a surface of the shaft, wherein the hinged component defines a gap extending from the recess to an outer surface of the hinged component, thereby permitting compression of the hinged component to increase the friction between the surface of the hinged component and the surface of the shaft. Friction hinges may further have one or more retainers positioned to urge the surface of the hinged component against the surface of the shaft, thereby maintaining friction between the surface of the hinged component and the surface of the shaft as the hinged component is moved relative to the shaft about the pivot axis; wherein friction is generated between the hinge component and the shaft sufficient to resist unintended movement of the hinge component relative to the shaft about the pivot axis.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letters designation may be dropped. Included in the drawings are the following figures:

FIG. 4b is a front view depicting the subassembly of FIG. 4a;

FIG. 4c is a side view depicting the subassembly of FIG. 4a;

FIG. 5a is a front perspective view depicting the subassembly of FIG. 4a, in an upward position;

FIG. 5b is a front view depicting the subassembly of FIG. 5a;

FIG. 5c is a side view depicting the subassembly of FIG. 5a;

FIG. 6b is a side view depicting the subassembly of FIG. 6a;

FIG. 7 is an exploded front perspective view of the subassembly of FIG. 4a;

FIGS. 9a and 9b are exploded perspective views of the friction module depicted in FIGS. 8a and 8b;

FIGS. 10a-10h depict an embodiment of a slider component that may be used in the adjustable headrest of FIG. 1;

FIGS. 11a-11c depict an embodiment of a guide component that may be used in the adjustable headrest of FIG. 1;

FIGS. 12a-12e depict an embodiment of a retainer component that may be used in the adjustable headrest of FIG. 1.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Referring to the figures generally, embodiments of the present invention include friction modules, friction hinges, and adjustable headrest apparatuses. The friction modules may be used in any device where it is desirable to provide friction between components that slide and/or rotate relative to one another. The friction hinges may be employed in any system or apparatus where a hinge may be employed. Embodiments of the friction hinge provide symmetrical or asymmetrical friction upon rotation in different directions. The adjustable headrest may be employed on any seat where a headrest is desired. The adjustable headrest may be configured to include one or more friction modules and/or friction hinges as further described herein.

Figure 1:
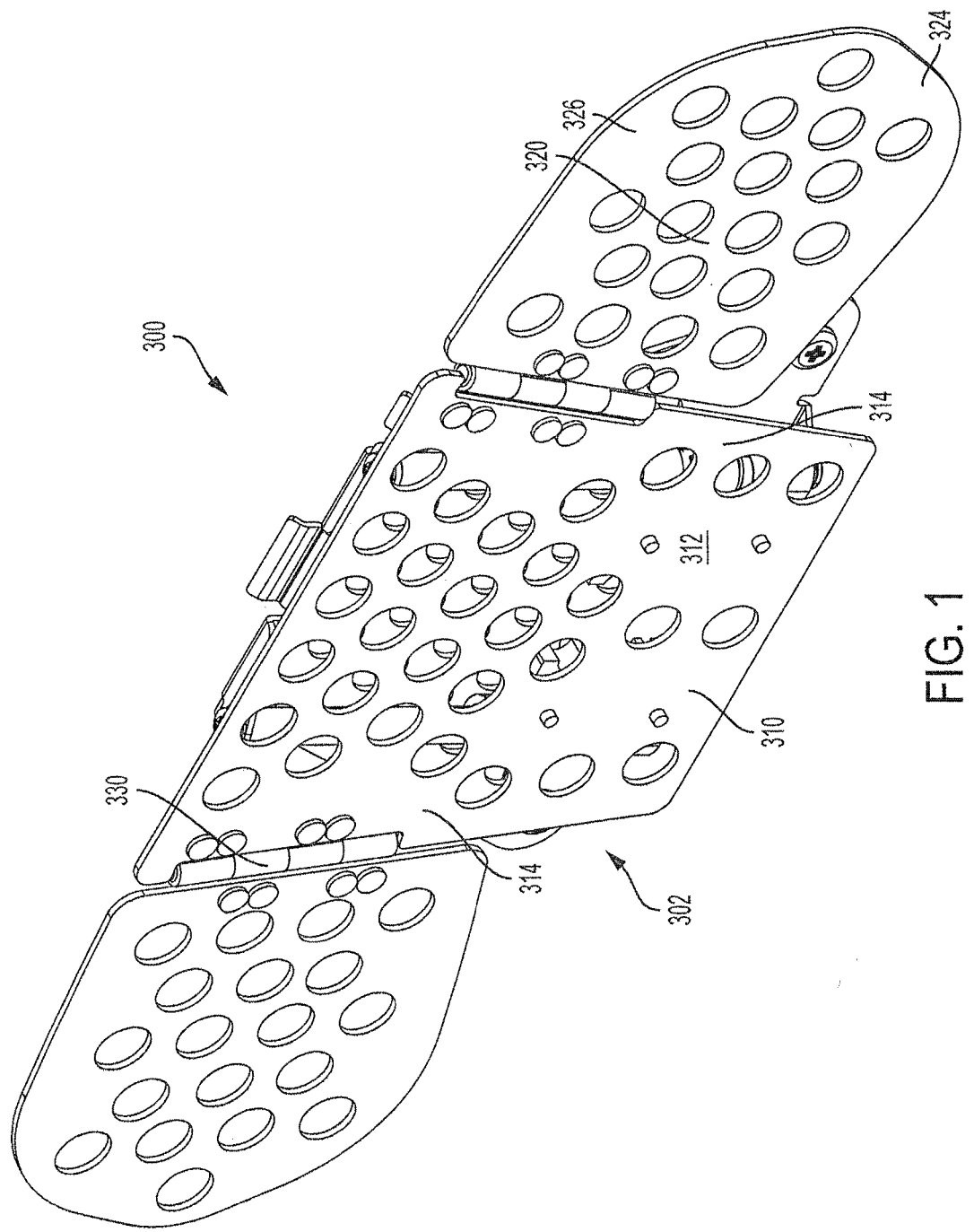
FIG. 1 is a front perspective view depicting an embodiment of an adjustable headrest.
Figure 2:
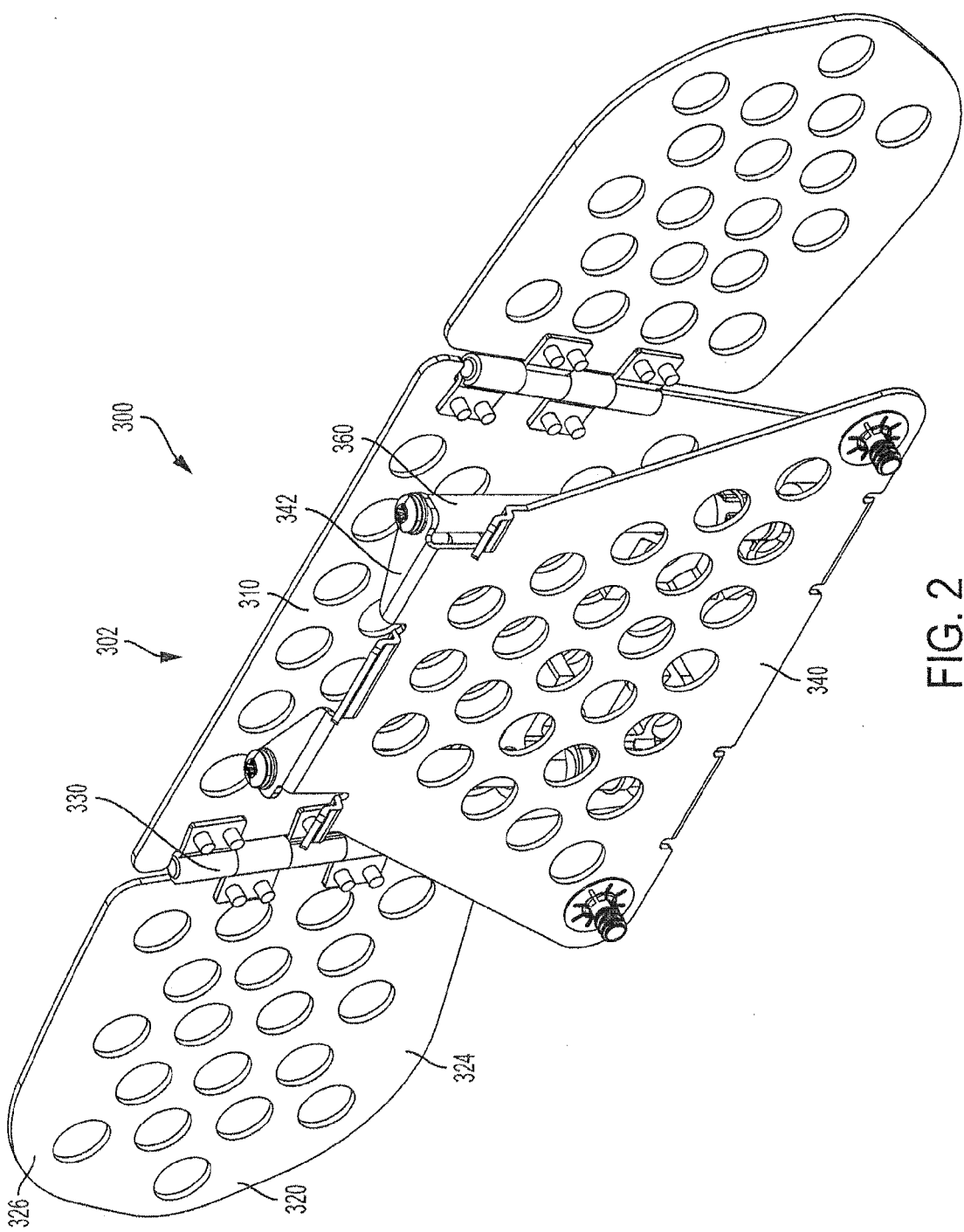
FIG. 2 is a rear perspective view depicting the adjustable headrest of FIG. 1.

FIGS. 1 and 2 depict an embodiment of an adjustable headrest apparatus 300. As a general overview, adjustable headrest 300 may include a head support 302, a guide 360, and a slider 370.

A head support portion 302 of adjustable headrest 300 may include a central portion 310. Central portion 310 has a frontal surface 312 that faces toward a passenger's head. The central portion 310 of the head support 302 may be configured to provide support for the passenger's head. For example, the central portion 310 of head support 302 may have a concave configuration. In one embodiment, upon the passenger positioning his or her head within the concave configuration of central portion 310, one or more side portions 314 of the central portion 310 substantially surround the passenger's head.

In another embodiment, upon the passenger positioning his or her head within the concave configuration of central portion 310, side portions 314 of central portion 310 do not substantially surround the passenger's head. According to preferred embodiments, central portion 310 of the head support 302 substantially surrounds the passenger's head if one or more side portions 314 align with or extend beyond the passenger's ears when the passenger positions his or her head in the concave configuration and is facing forward, away from adjustable headrest 300. By way of further example, as depicted in FIG. 1, the frontal surface 312 of central portion 310 may be flat as to reside within a single plane.

Head support 302 may include one or more wings 320 coupled to the central portion 310 of head support 302. The wings 320 may be attached, directly or indirectly, to central portion 310 of head support 302, e.g., by way of a hinge 330 attaching a side portion 324 of wing 320 to the side portion 314 of central portion 310. Alternatively, the wings 320 may be coupled, directly or indirectly, to central portion 310 of head support 302 by way of attachment to other components of adjustable headrest 300 that are attached and/or coupled to the central portion 310. For example, wings 320 may be coupled to central portion 310 by way of attachment and/or coupling to slider 370, guide 360, and/or other components attached and/or coupled to the central portion 310. Such coupling of components includes direct or indirect coupling such as by direct or indirect connection, affixation, attachment, joining, etc., of one or more components.

Preferably, wings 320 are rotatable with respect to central portion 310. In one embodiment, the at least one wing 320 is coupled for motion about an axis angled with respect to an adjustment path. The axis of rotation of wing 320 may form an angle with respect to a vertical axis. Upon rotation of wing 320 toward the passenger's body, a lower portion 324 of wing 320 may be in an advanced position toward the passenger with respect to an upper portion 326 of wing 320. In one embodiment, lower portion 324 of wing 320 is configured to align with the passenger's neck.

Head support 302 is configured to be moveable along an adjustment path relative to the seat back. Preferably, the adjustment path is in a vertical or near vertical direction, such as by general alignment with a seat back of a seat. Head support 302 is coupled to guide 360 and slider 370. Guide 360 may be positioned to extend in a direction along the adjustment path. Slider 370 is engaged and/or attached to guide 360 to facilitate movement of head support 302 along the adjustment path.

By coupling head support 302 to guide 360 and slider 370, head support 302 is movable along the adjustment path. In one embodiment, head support 302 is attached to the slider 370, and the slider 370 is engaged and/or attached to the guide 360, so that the head support 302 is coupled to guide 360 by way of attachment to slider 370. In this embodiment, slider 370 may be moveable with head support 302 along the adjustment path.

In another embodiment, head support 302 is attached to the guide 360, and the guide 360 is engaged and/or attached to the slider 370, so that head support 302 is coupled to slider 370 by of attachment to guide 360. Pursuant to this embodiment, guide 360 may be moveable with the head support 302 along the adjustment path.

Referring to FIG. 2, an adjustable headrest 300 may include a mounting portion 340 that is configured for attachment to a seat back. The mounting portion 340 is further coupled to head support 302. In one embodiment, mounting portion 340 is coupled to head support 302 by way of attachment to the guide 360. In another embodiment, mounting portion 340 is coupled to head support 302 by way of attachment to the slider 370.

Figure 3:
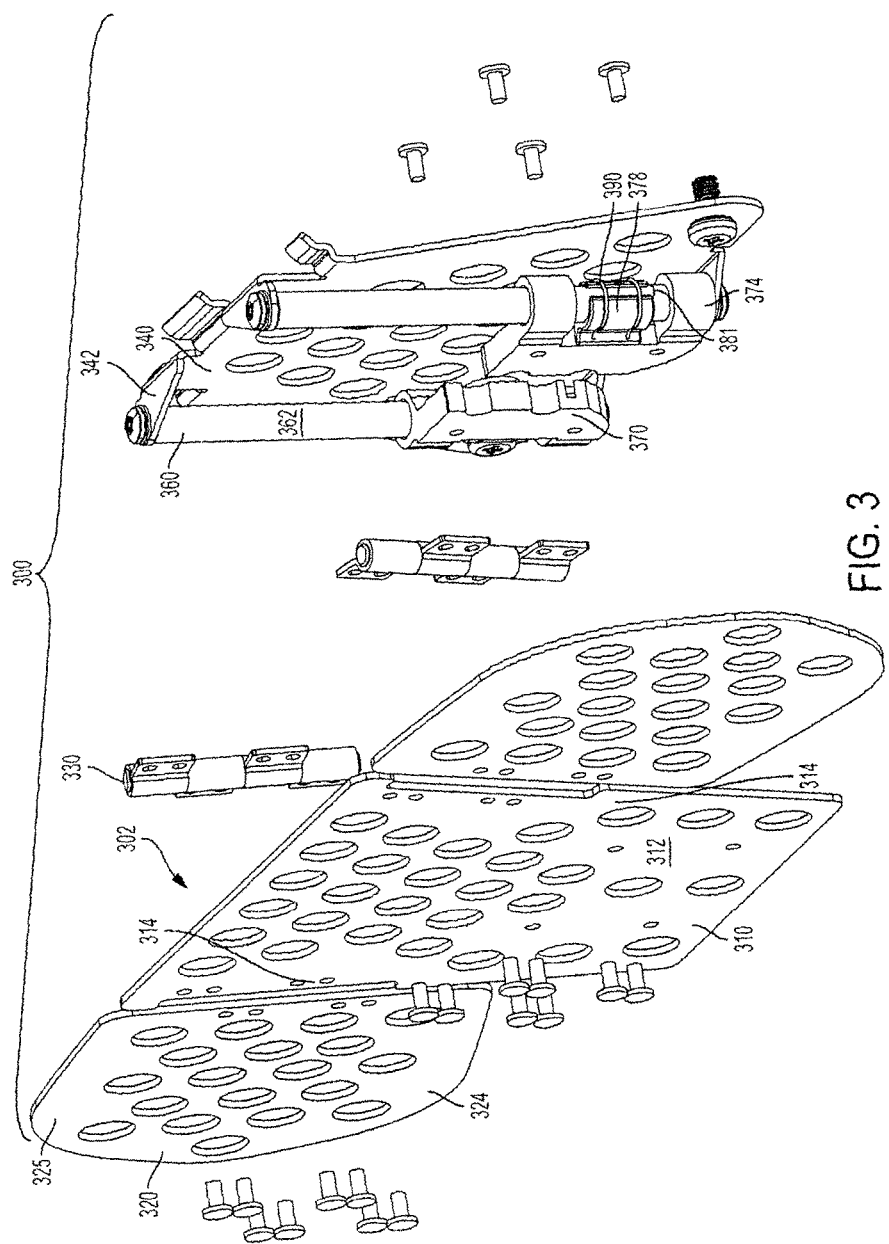
FIG. 3 is an exploded front perspective view depicting the adjustable headrest of FIG. 1 to reveal internal components.

The mounting portion 340 may have an attachment section 342 to facilitate attachment of mounting portion 340 to another component of the adjustable headrest 300 and/or the seat back. Attachment to the mounting portion 340 may be mechanical, such as by welding, riveting, screwing, nailing, bolting, etc., or non-mechanical, such as by adhesives or the like. As shown in FIG. 3, for example, rivets are used for various connections between components of the assembly. For example, rivets are used to fasten hinges of the head support as shown in FIGS. 2 and 3. Although these rivets are not shown as being in a riveted condition in the figures (for example in FIGS. 2 and 3), it will be understood that such rivet fasteners are riveted into place to complete the assembly process.

Implementing mounting portion 340 enables quick and easy coupling of the head support 302 and/or the adjustable headrest 300 to a seat back. Additionally, the mounting portion 340 may protect the internal components of the adjustable headrest 300, e.g., guide 360, slider 370, a retainer 390, and/or any attachments, from various impacts, forces, pressures, vibrations, or the like, received to the mounting portion 340 as the result of employing the adjustable headrest 300 in a vehicle and/or the result of a passenger's actions, e.g., a child hitting or otherwise impacting the back of the seat and/or adjustable headrest 300.

Figure 4A:
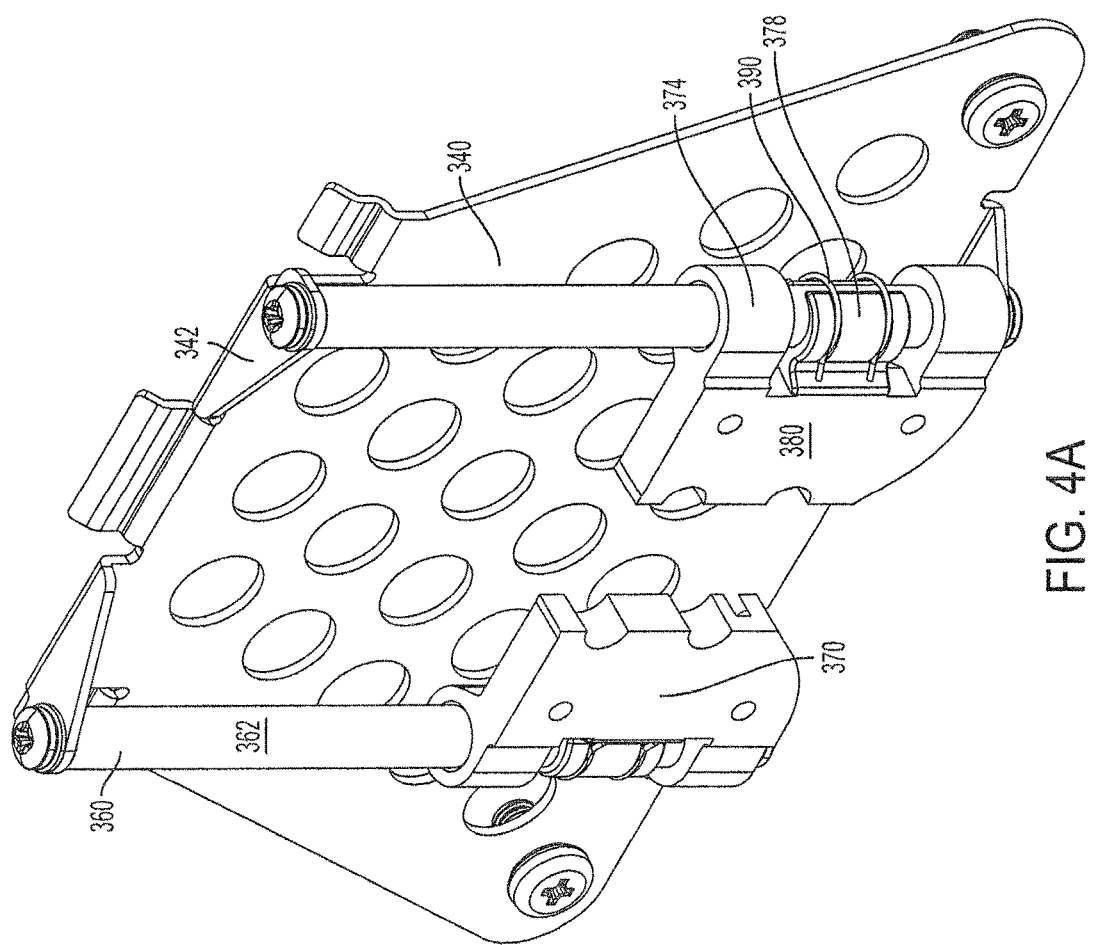
FIG. 4a is a front perspective view depicting a subassembly of components of the adjustable headrest of FIG. 1, in a downward position.
Figure 4C:
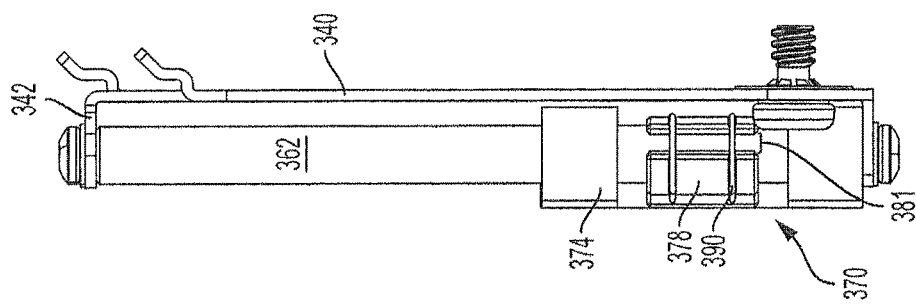
Figure 4B:
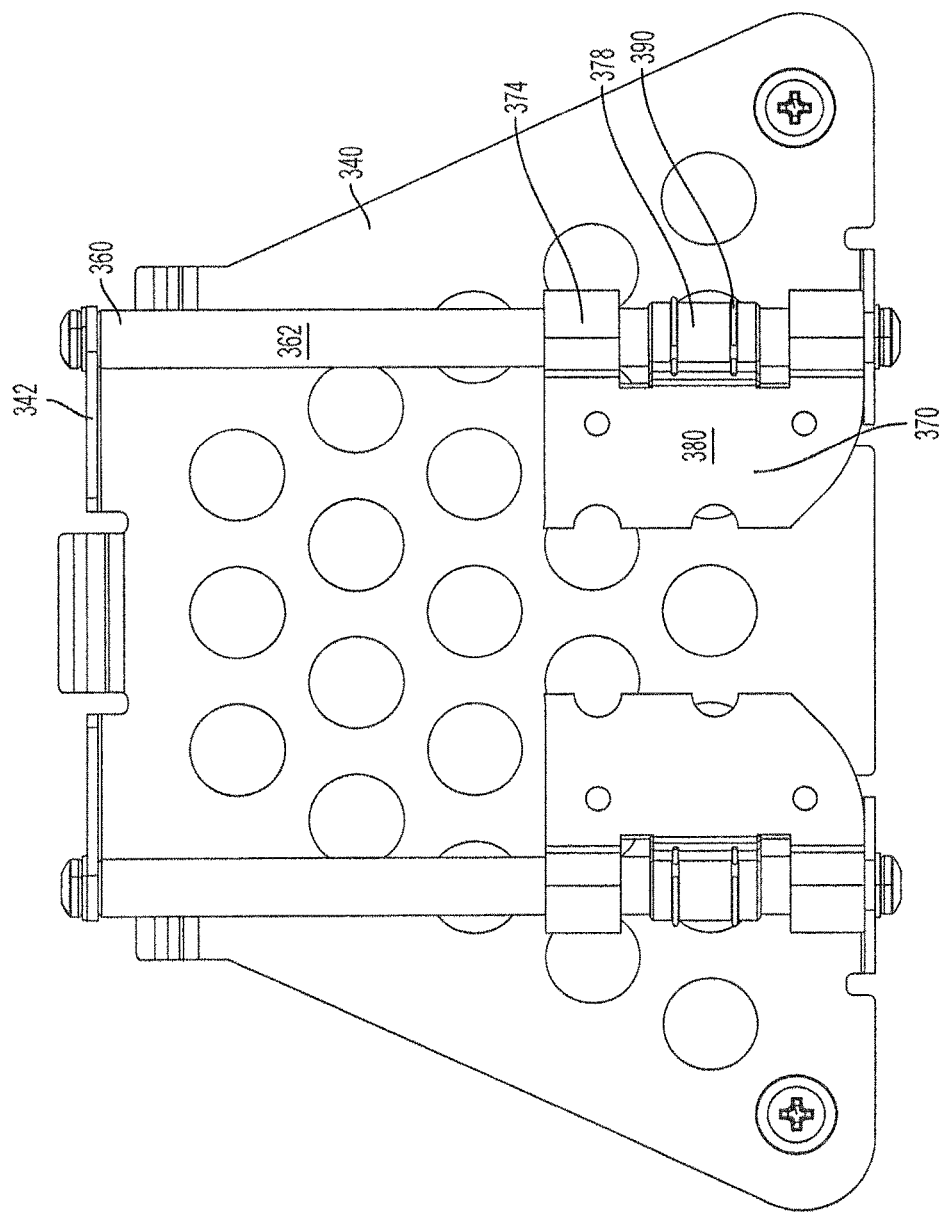
Figure 6B:
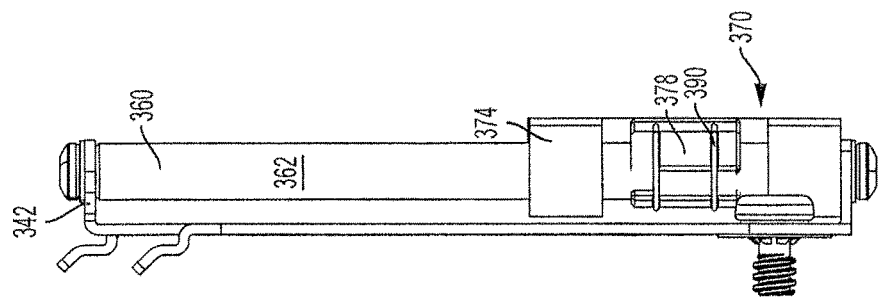
Figure 6A:
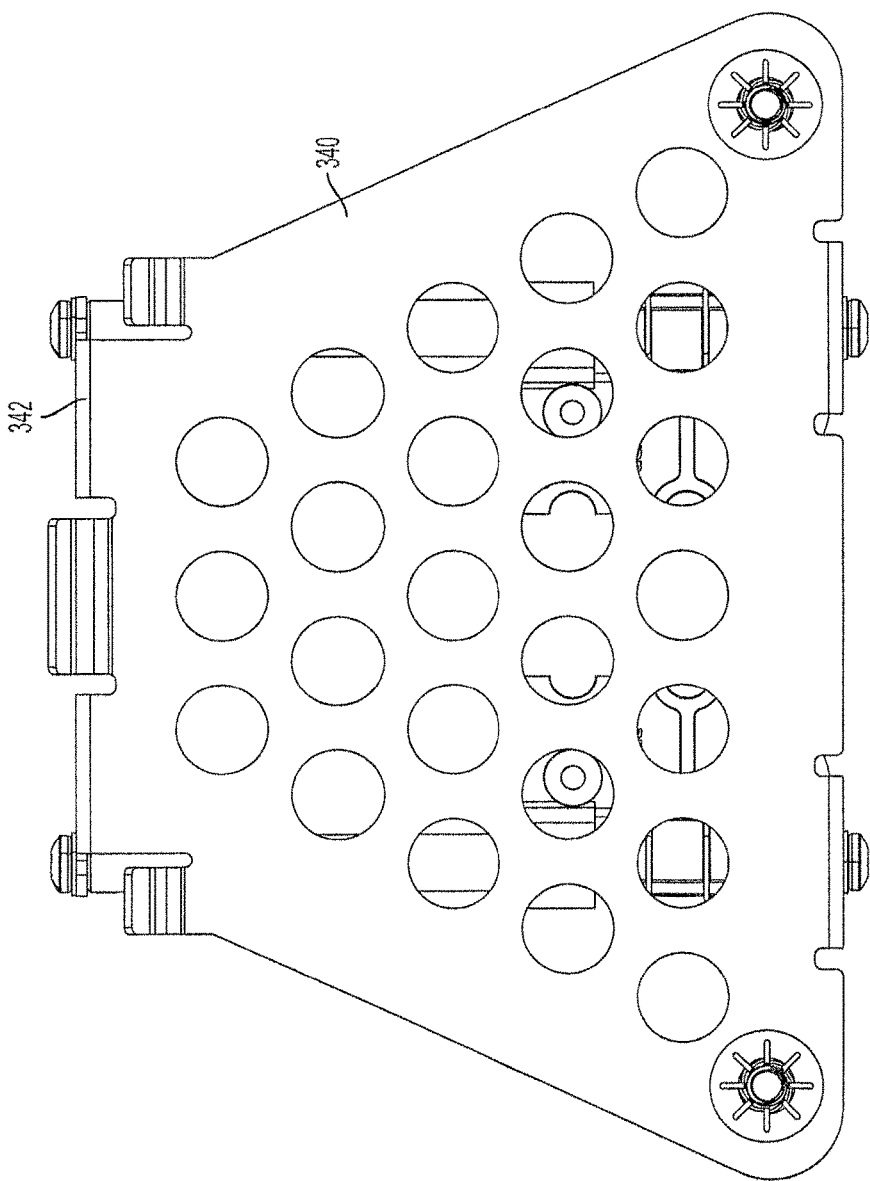
FIG. 6a is a rear view depicting the subassembly of FIG. 4a, in a downward position.

FIGS. 4a-4c depict the internal components of an exemplary adjustable headrest 300 having a mounting portion 340. In this embodiment, mounting portion 340 is coupled to the sliders 370 by way of attachment to guides 360. Sliders 370 are in a downward position with respect to the adjustment path. Although not illustrated in FIGS. 4a-4c, a head support 302 may be coupled and/or attached to sliders 370.

FIGS. 5a-5c also depict the internal components of an adjustable headrest 300 having a mounting portion 340. Unlike FIGS. 4a-4c, the sliders 370 depicted in FIGS. 5a-5c are in an upward position. Sliders 370 may be positioned at any point along the adjustment path between the upward position and the downward position. Accordingly, in embodiments where the head support 302 is coupled and/or attached to sliders 370, the head support 302 may also be positioned at any point along the adjustment path between the upward and downward positions.

In other embodiments, guide 360 is moveable along the adjustment path between the upward and downward positions. In embodiments where a mounting portion 340 is also employed, mounting portion 340 may be coupled to guide 360 by way of attachment to slider 370. Accordingly, the guide 360 may be moveable between the upward and downward positions along the adjustment path with respect to slider 370 and mounting portion 340. A head support 302 may be coupled and/or attached to guide 360 to enable head support 302 to be positioned at any point along the adjustment path between the upward and downward positions.

The head support 302 may be configured to rotate about a pivot axis that is defined by a pivot device (not shown). The pivot axis may be angled with respect to the adjustment path, thereby permitting pivotal movement of the head support 302 with respect to the seat about the pivot axis. In one embodiment, the pivot axis is perpendicular to the adjustment path. In another embodiment, the pivot axis is parallel to the top of the seat back.

The pivot device may be employed to enable the head support 302 to rotate toward and/or away from the passenger's head. The pivot device may be designed as a hinge, such as the rotational hinge described herein, or any other device and/or mechanism that enables pivoting or rotation about an axis. Preferably, the pivot device is attached and/or coupled to the head support 302 and a component of the adjustable headrest 300 that is also moveable along the adjustment path. In one embodiment, the pivot device is attached and/or coupled to head support 302 and slider 370, thereby enabling the head support 302 to be moveable along the adjustment path and rotatable about the pivot axis. In another embodiment, the pivot device is attached and/or coupled to head support 302 and guide 370, thereby enabling the head support 302 to be moveable along the adjustment path and rotatable about the pivot axis.

Figure 7:
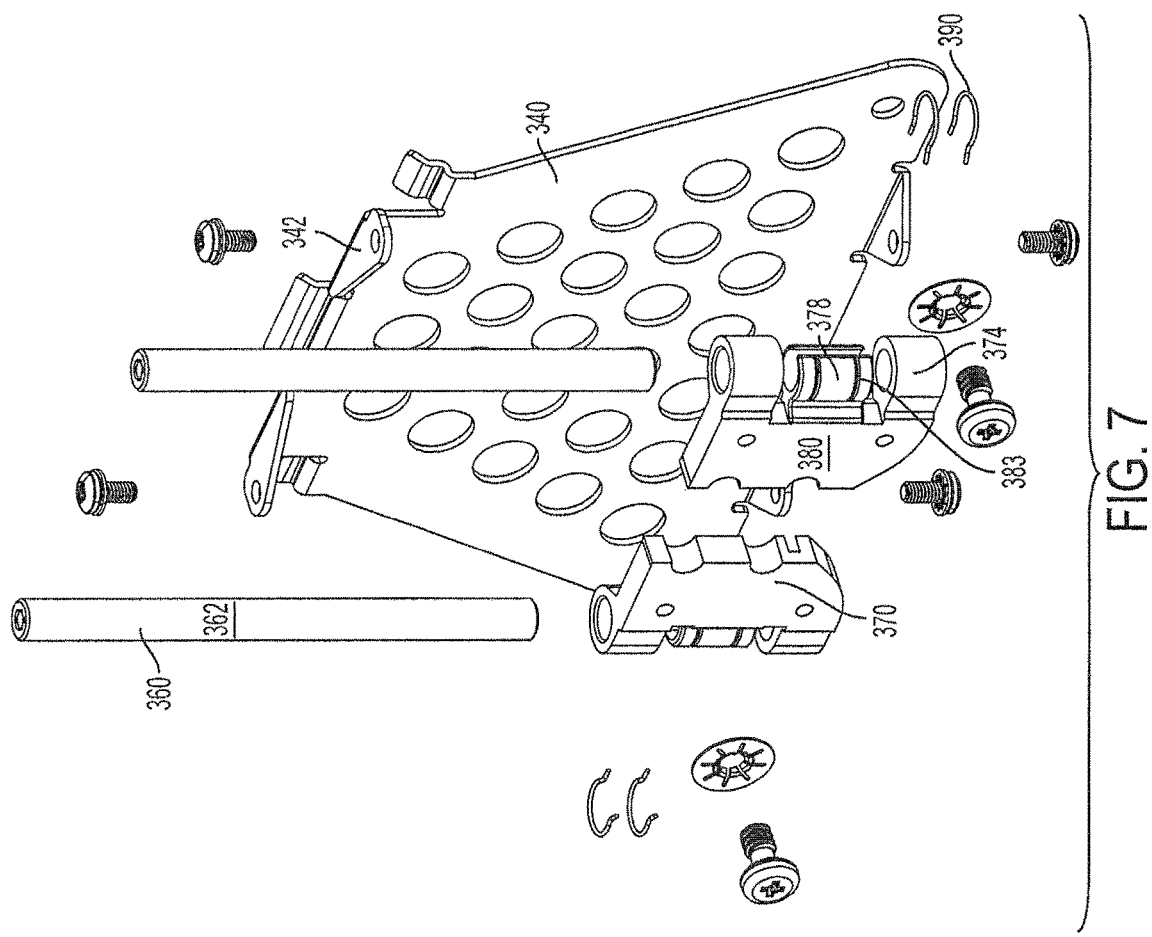
Figure 8A:
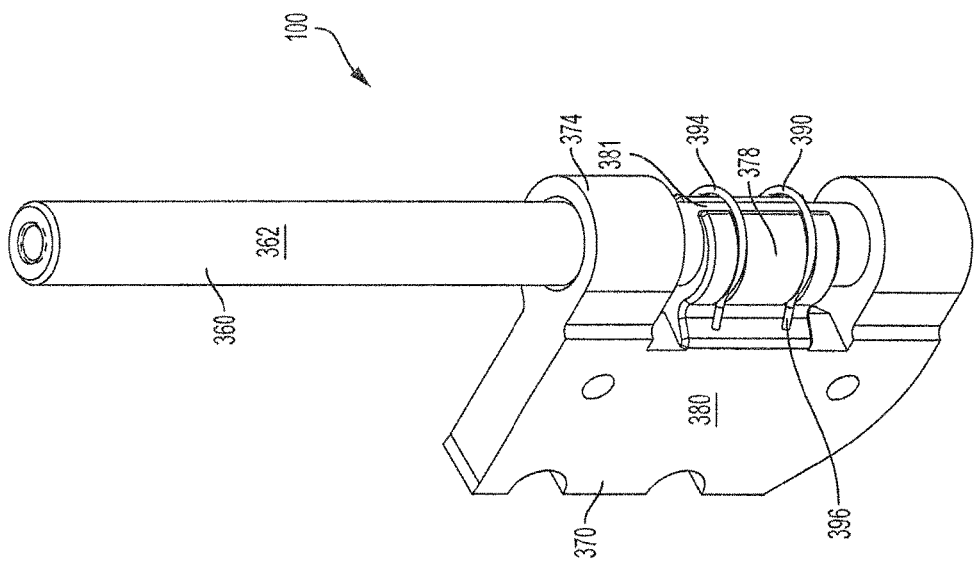
FIGS. 8a and 8b are perspective views depicting an embodiment of a friction module that may be used in the adjustable headrest depicted in FIG. 1.
Figure 8B:
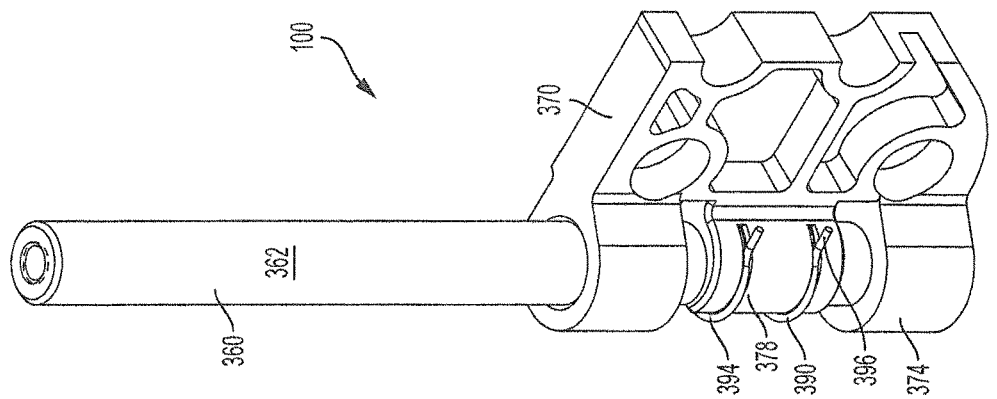

Referring to FIGS. 7-9, exemplary internal components of an adjustable headrest 300 are further disclosed hereafter. The internal components of adjustable headrest 300 may include a friction module 100, which further includes a guide 360 and a slider 370. The friction module 100 may also include one or more retainers such as a retainer 390. Although the friction module 100 is described with reference to an embodiment configured for adjustable headrest 300, one of skill in the art would readily recognize the various applications of friction module 100 in other apparatuses, devices, and/or systems based on the description herein. For example, friction module 100 would be highly advantageous in any device where a predetermined and modifiable amount of friction is desired between two or more components that slide and/or rotate with respect to one another. For example, a friction module (such as friction module 100 for example or modifications of friction module 100) would be highly advantageous when used with sliding components of various types of assemblies in various industries and applications. Illustrative examples include furnishings, arm rests, tray tables, extensions, adjusters, and any other assembly in which two or more components slide and/or rotate with respect to one another along or about a path or axis.

Referring to 10a-10h, slider 370 has an inner surface 372 that defines a recess 371 for receiving guide 360. The inner surface 372 of the slider 370 may be in contact with the outer surface 362 of guide 360 upon the recess 371 receiving guide 360. Slider 370 may be configured to have two or more separate inner surfaces 372 defining one or more recesses 371 that contact guide 360. In one embodiment, the two or more separate inner surfaces 372 of slider 370 define a single recess 371. In another embodiment, the two or more separate inner surfaces 372 of slider 370 define two or more recess 371.

Additionally or alternatively, the one or more recesses 371 of slider 370 may receive one or more guides 360. For example, a single slider 370 defining two recesses 371 on either end of the slider 370 may be positioned between two guides 360 so that each recess 371 receives a different guide 360. By way of another example, more than one slider 370 defining one or more recesses 371 may be engaged and/or attached to more than one guides 360, wherein each slider 370 receives only one guide 360. In one embodiment, the plural guides 360 are configured to be coupled to the seat and each of the recesses 371 defined by inner surfaces 372 of the slider 370 receives one of the guides 360. Upon receiving guide 360 in recess 371, slider 370 may be engaged and/or attached to guide 360.

Slider 370 and/or guide 360 may rotate and/or slide with respect to each other. In one embodiment, slider 370 is prevented from rotation relative to guide 360 about the longitudinal axis of guide 360. For example, the slider 370 may be coupled to head support 302 to prevent slider 370 from rotating with respect to guide 360. By way of further example, the inner surface 372 of slider 370 may be configured to have a portion of inner surface 372, e.g., a protrusion, that engages a portion of outer surface 362 of guide 360, e.g., an indent or groove, to prevent rotation of slider 370 with respect to guide 360. In another embodiment, slider 370 is prevented from sliding along the length 364 of guide 360. According to a further embodiment, slider 370 may simultaneously rotate around guide 360 and slide along the length 364 of guide 360.

The slider 370 may delineate a gap 381 extending from the recess 371 to an outer surface 380 of slider 370, thereby permitting compression of the slider 370 to increase the friction between the inner surface 372 of the slider 370 and the outer surface 362 of the guide 360. The gap 381 enables slider 370 to be deformed without employing substantial force and/or forming the slider 370 from highly deformable material(s). Accordingly, slider 370 may be formed from a durable material, such as a plastic material and/or metallic material. In one embodiment, slider 370 is formed from a plastic material.

The slider 370 may be configured to have sections integrally formed from, attached, and/or coupled to slider 370. For example, slider 370 may include a block section 374 having an inner surface 376 that defines a recess 373. The recess 373 defined by inner surface 376 of block section 374 may also be an aperture, whereby a guide 360 is received. Block section 374 may be configured without a gap to facilitate compression of the block section 374. Accordingly, the inner surface 376 of block section 374 may provide minimal amounts of friction with outer surface 362 of guide 360.

Block section 374 may be configured to facilitate insertion of guide 360 into recess 373 and/or recess 371 during manufacturing, repair, etc. Block section 374 may also be configured to protect the slider 370 and/or a friction section 378 from impacts with other components of adjustable headrest 300, e.g., the attachment section 342 of mounting portion 340, which may result from adjustment of the head support portion 302 along the adjustment path, e.g., as a passenger moves the adjustable headrest 300 with respect to the seat. Block section 374 may provide additional strength to resist disengagement and/or detachment of slider 370 and guide 360. It may also serve to align the guide with respect to the slider such that the recess(es) formed by the slider extend along the same axis as the guide.

The slider 370 may also be configured to include a friction section 378, wherein the inner surface 372 of the friction section 378 defines a recess 371 that contacts the outer surface 362 of the guide 360 to produce an amount of friction. In one embodiment, the slider 370 is solely the friction section 378. The recess 371 defined by inner surface 372 of friction section 378 may be part of the recess 373 defined by inner surface 376 of block section 374. In one embodiment, the majority of the friction produced by slider 370 is produced by the contact of inner surface 372 of friction section 378 to outer surface 362 of guide 360. The friction section 378 may be formed of a material different from another portion or section of the slider 370.

The slider 370 may be configured to produce varying amounts of friction, e.g., by employing one or more retainers 390 of different shapes and/or materials. The slider 370 has an outer surface 380 that may define grooves 383. The grooves 383 may be positioned to at least partially receive a retainer 390. Additionally, outer surface 380 of slider 370 may define one or more grooves 383 to at least partially receive one or more retainers 390. The depth (not shown) of grooves 383 may vary along the length of grooves 383. The depth of grooves 383 may be varied to form a notch-receiving portion (not shown) that engages a portion of retainer 390, e.g., a notch portion 398 of retainer 390, to increase the amount of force required remove the retainer 390 from groove 383.

Although such groove(s) are optionally provided in the surface of the slider to hold or engage or otherwise at least partially receive one or more retainer, the retainer(s) on the slider(s) could alternatively be clamps or bands at least partially surrounding the slider(s). In such embodiments, the groove(s) can be eliminated.

Depicted in FIGS. 11a-11c, guide 360 has an outer surface 362 and length 364. The guide 360 may be configured to have a variety of cross-sectional shapes such as a cylinder, a triangle, a rectangle, a hexagon, or any other shape. By providing a non-cylindrical guide, relative rotation of the guide within the slider can be limited or prevented.

Referring to FIGS. 12a-12e, a retainer 390 may be positioned to contact at least a portion of the periphery, e.g., the outer surface 380, of slider 370 and/or friction section 378 of slider 370. Retainer 390 may have a shape configured to extend along the outer surface 380 of slider 370. The retainer 390 may include end portions 396 and a middle portion 394 having one or more curvatures. The one or more curvatures of middle portion 394 may extend from a first end portion 396 to a second end portion 396.

In one embodiment, middle portion 394 has a curvature that is C-shaped, i.e., the retainer 390 has the general shape of the letter "c," which is not to be limited to any specific font, size, and/or capitalization. The end portions 396 may extend in the projected direction of the middle portion 394 as to form an extension of the middle portion 394. Alternatively, the end portions 396 may extend in a direction away from the projected direction of the middle portion 394. For example, end portions 396 may extend outwardly, away from the center of the curvature of middle portion 394.

In one embodiment, the curvature of middle portion 394 and the end portions 396 together form an omega-shape, i.e., the retainer 390 has the general shape of the Greek letter "Ω," which is not to be limited to any specific font, size, and/or capitalization. In another embodiment, a notch portion 398 is formed at the point of connection between middle portion 394 and end portions 396 by the end portions 396 extending in a direction that forms an angle with the projected direction of the middle 394. The end portions 396 may also extend inward with respect to the one or more curvatures of middle section 394. Preferably, retainer 390 has a shape configured to extend along outer surface 380 of slider 370. For example, retainer 390 may be configured to be received by grooves 383 of outer surface 380 of slider 370 and/or friction section 378 of slider 370.

If the retainer 390 is provided with a "C" or omega shape, the friction section 378 is also preferably provided with a corresponding "C" or omega shape. In other words, the outer surface of the friction section 378, or the inner surface of the grooves 383, are preferably provided with a shape corresponding generally to that of the retainer 390 in order to provide substantially uniform contact and to evenly distribute the forces generated by the retainer 390 against the friction section 378. Alternatively, separate contact surfaces can be provided for one or more point or area contacts between the friction section 378 and the retainer 390.

Retainer 390 may be employed to urge the inner surface 372 of slider 370 and/or friction section 378 against the outer surface 362 of guide 360, thereby maintaining friction between inner surface 372 of the slider 370 and outer surface 362 of guide 360. By employing retainer 390, unintended movement between slider 370 and guide 360 along the adjustment path may be resisted and/or prevented. For example, resisting and/or preventing unintended movement between slider 370 and guide 360 includes providing sufficient friction to maintain the position of adjustable headrest 300 under forces such as: the forces produced by gravity, e.g., on head support 302 and other components of adjustable headrest 300 that are not fixed along the adjustment path with respect to the seat; forces produced by the vehicle's movement, e.g., vibrations, acceleration, deceleration, bumps or jolts, and/or take-off and landings; and forces produced by the passenger that were not intended to adjust the adjustable headrest 300, e.g., movement of the passenger's head while his or her head is contacting head support 302 and/or lightly bumping into adjustable headrest 300. Retainer 390 may be formed of various materials including plastics and or metallic compounds. In one embodiment, retainer 390 is formed from a metallic material.

The slider 370 may be configured to support one or more retainers 390, whereby the friction between the inner surface 372 of the slider 390 and the surface 362 of the guide 360 is increased by adding the one or more additional retainers 390. In one embodiment, the outer surface 380 of the slider 370 defines plural grooves 383 positioned to at least partially receive the retainers 390.

By employing guide 360, slider 370, and/or retainer 390, friction module 100 and/or adjustable headrest 300 may be configured to have an amount of friction between the inner surface 372 of the slider 370 and the outer surface 362 of the guide 360 as the slider 370 is moved relative to the guide 360 along the adjustment path that is within a predetermined range, thus providing a range of force needed to move the guide and slider with respect to one another. Additionally, the predetermined range of force may be maintained after a predetermined number of cycles of movement of the slider 370 relative to the guide 360 along the path. In one embodiment, the materials used in the guide 360, the slider 370, and/or the retainer 390 are selected so that the predetermined range of friction is maintained over a predetermined range of temperatures.

For example, a friction module such as friction module 100 and/or an adjustable headrest such as adjustable headrest 300 may be configured to have a force range of 3-6 lb. such that a force in that range is required to slide the components with respect to one another along the adjustment path. A sliding force within the force range can be provided by a single guide and a single slider or collectively by a combination of guides and sliders. For example, a sliding force within the force range can also be provided by a single guide and plural sliders on that guide, or by plural guides and plural sliders on the guides. Each such guide and slider would therefore be configured to provide a predetermined sliding force, either alone or in combination with one or more other guides and sliders.

Such a predetermined range of forces is preferably maintained over a substantial product life, during which the relative position of the components are cycled in each movement. For example, even after a predetermined number of cycles of movement of the slider 370 relative to the guide 360 along the path, the force required to move the slider 370 relative to the guide 360 preferably remains within a predetermined range of forces. While various numbers of cycles can be selected, a number of cycles is optionally selected within a range of 10,000-20,000.

Such a predetermined range of forces is also preferably maintained over a substantial temperature range, recognizing that the relative position of the components may be changed in various temperature environments. For example, even over a substantial temperature range, the force required to move the slider 370 relative to the guide 360 preferably remains within a predetermined range of forces. While various temperature ranges can be selected, one exemplary temperature range is −20° C. to +40° C.

Adjustable headrest 300 may also include one or more rotational hinges. Rotational hinges may be employed, e.g., to enable rotation of wings 320 with respect to central portion 310 and/or as a pivot device to enable pivoting and/or rotation of head support 302 with respect to the pivot axis.

Whether part of a headrest or separate for use as part of another assembly, rotational hinges may include a shaft (such as guide 360 in FIGS. 8a-9b) having a longitudinal axis extending along the pivot axis (such as the longitudinal axis of guide 360) and a hinged component (such as slider 370 in FIGS. 8a-9b) having an inner surface (such as inner surface 372 in FIGS. 9a and 9b). The surface of the hinged component defines a recess (such as recess 371 in FIGS. 9a and 9b) configured to receive the shaft, whereby the inner surface of the hinged component contacts a surface (such as outer surface 362 in FIGS. 8a-9b) of the shaft. The hinged component may be rotatable relative to the shaft about the pivot axis in opposite directions. The hinged component may be prevented from sliding relative to the shaft along the longitudinal axis of the shaft.

The hinged component may be configured to define a gap (such as gap 381 in FIGS. 9a-9b) extending from the recess defined by the inner surface to an outer surface (such as outer surface 380 in FIGS. 9a-9b) of the hinged component. The gap enables compression of the hinged component to increase the friction between the surface of the hinged component and the surface of the shaft such that the surface of the hinged component contacts a surface of the shaft. The friction generated between the hinged component and the shaft may be sufficient to resist unintended movement of the hinged component relative to the shaft about the pivot axis.

The rotational hinge may be configured to produce asymmetrical friction torque; e.g., the friction produced by rotating the hinged component in a first rotational direction may be unequal to the friction produced by rotating the hinged component in a second rotational direction. Such optional asymmetric torque is advantageous for applications in which it is desired to require a force to rotate a hinged component in a first rotation direction and a larger force to rotate the hinged component in a second or opposite direction. For example, the wings of the headrest assembly illustrated in FIG. 1 are preferably harder to move rearwardly (away from the user's head) in order to provide head support as compared to forwardly (toward the head). In other words, the force required to rotate the wings rearwardly is preferably greater than the force required to rotate them forwardly, thus providing improved head support while still facilitating adjustment of the wing positions.

In one embodiment, the gap extending from the recess to the outer surface of the hinged component may be positioned to provide asymmetric friction torque when the hinged component is rotated in different directions.

In another embodiment, the recess defined by the surface of the hinged component may be configured and/or positioned to provide asymmetric friction torque when the hinged component is rotated in the opposite directions. In yet a further embodiment, a thick portion of the hinged component that defines the recess has a greater thickness than a thin portion of the hinged component, whereby compression of the hinge component compresses the thin portion of the hinged component more than the thick portion of the hinged component to provide asymmetric friction torque. The asymmetrical friction torque generated between the hinged component and the shaft may be increased by utilizing one or more retainers 390.

One or more retainers 390 may be employed to increase the friction generated between the hinged component and the shaft. The retainers 390 may be configured as described herein with respect to the friction module 100 and/or adjustable headrest 300. Additionally, various modifications of retainers 390 pursuant to the specific application of the rotational hinge will be understood by one of skill in the art from the description herein.

As noted previously in connection with friction module 100 and adjustable headrest 300, a rotational hinge may be configured to have an amount of friction within a predetermined range, thus providing a range of force needed to rotate its components with respect to one another. Additionally, the predetermined range of force may be maintained after a predetermined number of cycles of rotation of the components. Also, the materials used in the rotational hinge are preferably selected so that the predetermined range of friction is maintained over a predetermined range of temperatures.

For example, a rotational hinge may be configured to have a predetermined force range such that a force in that range is required to rotate the components with respect to one another about a pivot axis. A rotational force within the force range can be provided by a single rotational hinge or collectively by a combination of hinges. Each such rotational hinge would therefore be configured to provide a selected rotational force, either alone or in combination with one or more other rotational hinges.

A predetermined range of rotational force is preferably maintained over a substantial product life, during which the relative position of the components are cycled in each movement. For example, even after a predetermined number of cycles of rotation, the force required to rotate components of the rotational hinge with respect to one another preferably remains within a predetermined range of forces. While various numbers of cycles can be selected, a number of cycles is optionally selected within a range of 10,000-20,000.

A predetermined range of rotational force is also preferably maintained over a substantial temperature range, recognizing that the relative position of the components may be changed in various temperature environments. For example, even over a substantial temperature range, the force required to rotate components of the rotational hinge preferably remains within a predetermined range of forces. While various temperature ranges can be selected, one exemplary temperature range is −20° C. to +40° C.

Figure 13A:
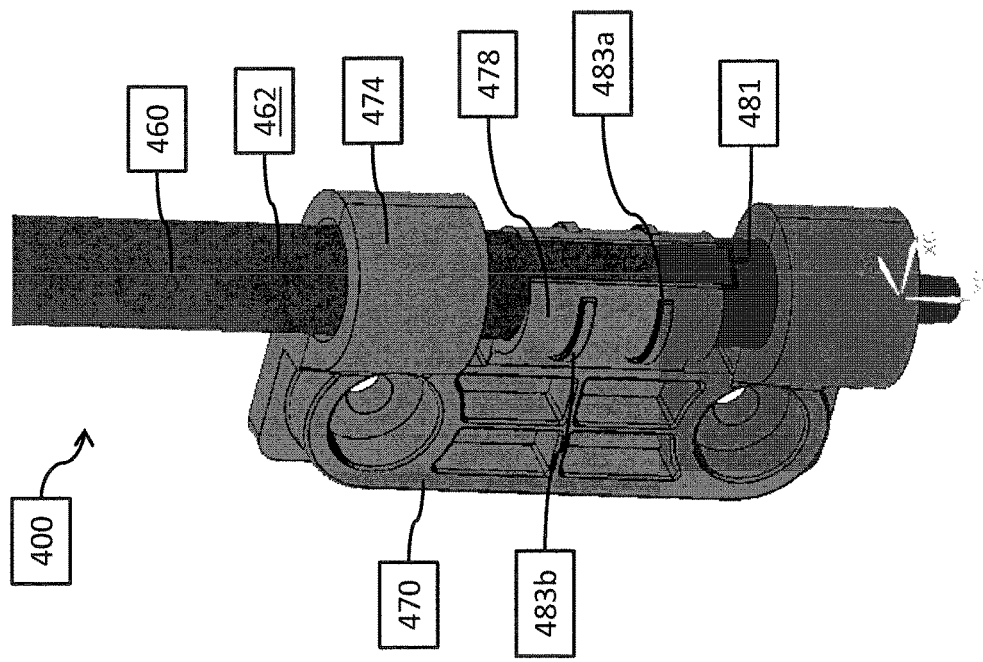
FIGS. 13a and 13b are perspective views of another embodiment of a friction module with and without a retainer, respectively, in accordance with aspects of the invention.
Figure 13B:
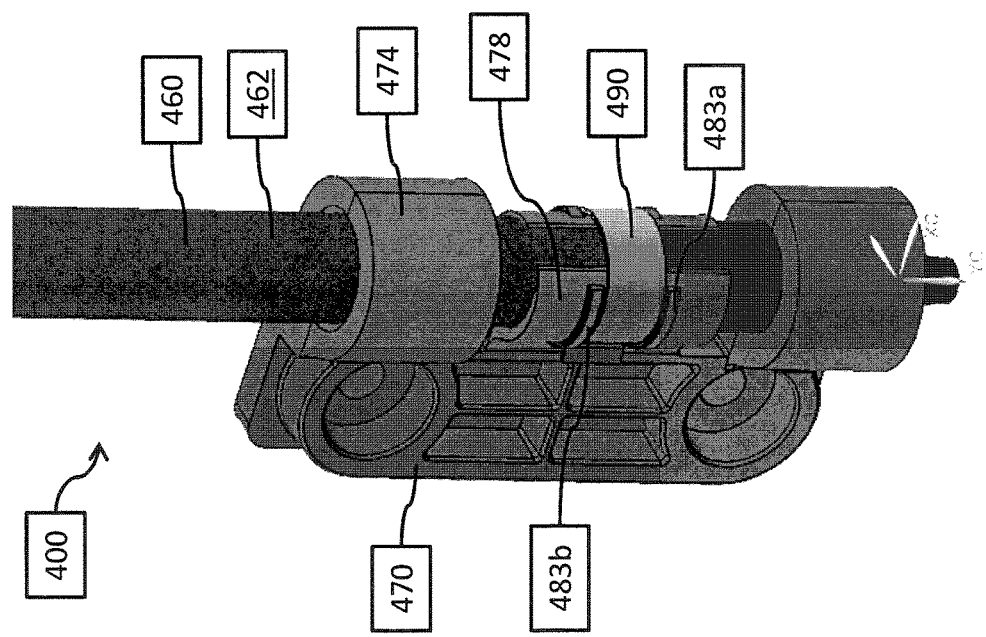

Referring to FIGS. 13*a* and 13*b*, illustrated is another embodiment of a friction module 400 in accordance with aspects of the invention. As a general overview, the friction module 400 includes a guide 460 and a slider 470. The friction module 400 may also include one or more retainers 490. As illustrated in FIG. 13*a*, retainer 490 is configured to be a retainer band. Friction module 400 may be highly advantageous in any device where a predetermined and modifiable amount of friction is desired between two or more components that slide and/or rotate with respect to one another. For example, a friction module 400 would be highly advantageous when used with sliding components of various types of assemblies in various industries and applications, such as furnishings, arm rests, tray tables, extensions, adjusters, etc.

The guide 460 has an outer surface 462 extending along a longitudinal axis of the guide 460. The slider 470 and/or guide 460 may rotate and/or slide with respect to each other. In one embodiment, the slider 470 is prevented from rotation relative to the guide 460 around the longitudinal axis of guide 460. In another embodiment, the slider 470 is prevented from sliding along a length of guide 460 and/or in the direction of the longitudinal axis of guide 460. According to a further embodiment, the slider 470 may simultaneously rotate around the guide 460 and slide along the length and/or in the direction of the longitudinal axis of the guide 460.

The slider 470 includes a block section 474 and a friction section 478. Block section 474 and friction section 478 each define a recess adapted to receive guide 460. Block section 474 may be configured to protect the slider 470 and/or a friction section 478 from impacts with objects, e.g., components of adjustable headrest 300 when friction module 400 is employed in adjustable headrest 300.

Friction section 478 has an inner surface that defines a recess that contacts the outer surface 462 of the guide 460 to produce an amount of friction. Friction section 478 delineates a gap 481 extending from the recess defined by the friction section 478 to an outer surface of the friction section 478, thereby permitting compression of the friction section 478 to increase the friction between the inner surface of the friction section 478 and the outer surface 462 of the guide 460. The gap 481 enables friction section 478 to be deformed without employing substantial force and/or forming the friction section 478 from highly deformable material(s). For example, one or more retainers 490 of different shapes and/or materials may be disposed on friction section 478 to increase the amount of friction produced between the inner surface of the recess defined by the friction section 478 and outer surface 462 of the guide 460.

The friction section 478 of slider 470 has an outer surface that defines a plurality of protrusions 483. The protrusions 483 may be configured to at least partially receive at least one retainer 490, e.g., between protrusion 483*a* and protrusion 483*b*. In one embodiment, retainer 490 contacts both protrusion 483*a* and protrusion 483*b* upon being positioned on friction section 478 between protrusion 483*a* and 483*b*.

A kit for an adjustable headrest may include one or more of the aforementioned components of the adjustable headrest 300 including a friction module 100 and/or a rotational hinge as described herein. The kit for an adjustable headrest may further include a pivot device and one or more cushions (not shown) and/or covering materials (not shown). The one or more cushions and/or covering materials may be coupled to the head support portion 302. Suitable techniques for employing one or more cushions or covering materials to the adjustable headrest 300 for providing additional comfort to a user will be understood by one of skill in the art from the description herein.

Additionally, one of skill in the art would understand how to assemble the adjustable headrest kit based on the drawings and description provided herein. Embodiments of kits for adjustable headrest 300 enable an assembler to increase or decrease the force required by a user to adjust the head support 302 along the adjustment path by increasing or decreasing the friction produced between inner surface 372 of the slider 370 and the outer surface 362 of the guide 360.

One exemplary method for increasing or decreasing the friction produced between inner surface 372 of the slider 370 and the outer surface 362 of the guide 360 includes adding or removing retainers 390 to slider 370. Another exemplary method includes replacing one or more retainers 390 with one or more retainers 390 formed of a different material or having a different shape. Yet, another exemplary method includes replacing the guide 360 and/or slider 370 with a guide 360 and/or slider 370 of a different material and/or shape.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. An adjustable headrest comprising:
a guide configured to be coupled to a seat;
a head support coupled to the guide and configured to be movable along an adjustment path relative to the seat;
a slider having a surface defining a recess receiving the guide such that the surface of the slider contacts a surface of the guide; and
a retainer positioned to urge the surface of the slider against the surface of the guide, thereby maintaining friction between the surface of the slider and the surface of the guide and resisting unintended movement of the slider with respect to the guide along the adjustment path,
wherein the slider includes two block sections that are separated and spaced apart along the guide and a friction section interposed between the two block sections, wherein each block section is slidably connected to the guide and the friction section includes the retainer.

2. The adjustable headrest of claim 1, wherein the guide is attached to the head support and is moveable with the head support along the adjustment path.

3. The adjustable headrest of claim 1, wherein the slider is attached to the head support and is moveable with the head support along the adjustment path.

4. The adjustment headrest of claim 1, wherein the slider is attached to a mounting portion of the seat.

5. The adjustment headrest of claim 1, wherein the guide is attached to a mounting portion of the seat.

6. The adjustable headrest of claim 1, wherein at least one wing of the head support is coupled for motion about a pivot axis angled with respect to the adjustment path.

7. The adjustable headrest of claim 1, further comprising a pivot device coupled to the head support and defining a pivot axis angled with respect to the adjustment path, thereby permitting pivotal movement of the head support with respect to the seat about the pivot axis.

8. The adjustable headrest of claim 7, wherein the pivot axis of the pivot device is perpendicular to the adjustment path.

9. The adjustable headrest of claim 1, wherein the slider defines a gap extending from the recess to an outer surface of the slider, thereby permitting compression of the slider to increase the friction between the surface of the slider and the surface of the guide.

10. The adjustable headrest of claim 9, wherein the outer surface of the slider defines a groove positioned to at least partially receive the retainer.

11. The adjustable headrest of claim 9, wherein the outer surface of the slider defines at least one protrusion configured to at least partially restrain the retainer against movement relative to the outer surface of the slider.

12. The adjustable headrest of claim 1, wherein the retainer is a retainer band.

13. The adjustable headrest of claim 1, wherein the retainer includes end portions and a curvature extending between the end portions.

14. An adjustable headrest kit comprising:
an adjustable headrest according to claim 1; and
a pivot device configured to be coupled to the head support and to define a pivot axis angled with respect to the adjustment path, thereby permitting pivotal movement of the head support with respect to the seat about the pivot axis.

15. A friction module for generating friction between components and resisting unintended movement of the components with respect to one another along a path, the friction module comprising:
a guide configured to be coupled to one of the components, the guide having a longitudinal axis extending along the path;
a slider configured to be coupled to another one of the components, the slider having a surface defining a recess receiving the guide such that the surface of the slider contacts a surface of the guide, wherein the slider defines a gap extending from the recess to an outer surface of the slider, thereby permitting compression of the slider to increase the friction between the surface of the slider and the surface of the guide; and
a retainer positioned to urge the surface of the slider against the surface of the guide, thereby maintaining friction between the surface of the slider and the surface of the guide as the slider is moved relative to the guide along the path;
wherein friction is generated between the components sufficient to resist unintended movement of the components with respect to one another along a path,
wherein the slider includes two block sections that are separated and spaced apart along the guide and a friction section interposed between the two block sections, wherein each block section is slidably connected to the guide and the friction section includes the retainer.

16. The friction module of claim 15, the slider being prevented from rotation relative to the guide about the longitudinal axis of the guide.

17. A friction hinge providing a pivot axis, the friction hinge comprising:
a shaft having a longitudinal axis extending along the pivot axis;
a hinged component having a surface defining a recess receiving the shaft such that the surface of the hinged component contacts a surface of the shaft,
wherein the hinged component defines a gap extending from the recess to an outer surface of the hinged component, thereby permitting compression of the hinged component to increase the friction between the surface of the hinged component and the surface of the shaft; and
a retainer positioned to urge the surface of the hinged component against the surface of the shaft, thereby maintaining friction between the surface of the hinged component and the surface of the shaft as the hinged component is moved relative to the shaft about the pivot axis;
wherein friction is generated between the hinge component and the shaft sufficient to resist unintended movement of the hinge component relative to the shaft about the pivot axis,
wherein the hinged component includes two block sections that are separated and spaced apart along the shaft and a friction section interposed between the two block sections, wherein each block section is slidably connected to the shaft and the friction section includes the retainer.

18. The friction hinge of claim 17, wherein the hinged component is rotatable relative to the shaft about the pivot axis in opposite directions, and the gap extending from the recess to the outer surface of the hinged component is positioned to provide asymmetric friction torque when the hinged component is rotated in the opposite directions.

19. The friction hinge of claim 17, wherein the hinged component is rotatable relative to the shaft about the pivot axis in opposite directions, and the recess defined by the surface of the hinged component is positioned to provide asymmetric friction torque when the hinged component is rotated in the opposite directions.

20. The friction hinge of claim 17, the hinged component being prevented from sliding relative to the shaft along the longitudinal axis of the shaft.

\* \* \* \* \*